United States Patent
Ridley

(10) Patent No.: US 10,122,743 B2
(45) Date of Patent: Nov. 6, 2018

(54) METHODS AND SYSTEMS FOR DETECTING ANOMALOUS BEHAVIOR OF NETWORK-CONNECTED EMBEDDED DEVICES

(71) Applicant: Senrio Inc., Portland, OR (US)

(72) Inventor: Stephen A. Ridley, Portland, OR (US)

(73) Assignee: Senrio Inc., Portland, OR (US)

( * ) Notice: Subject to any disclaimer, the term of this patent is extended or adjusted under 35 U.S.C. 154(b) by 193 days.

(21) Appl. No.: 15/333,084

(22) Filed: Oct. 24, 2016

(65) Prior Publication Data

US 2018/0115574 A1   Apr. 26, 2018

(51) Int. Cl.
*H04L 29/06* (2006.01)
*G06N 7/00* (2006.01)
*G06N 99/00* (2010.01)
*H04L 12/26* (2006.01)

(52) U.S. Cl.
CPC ......... *H04L 63/1425* (2013.01); *G06N 7/005* (2013.01); *G06N 99/005* (2013.01); *H04L 43/062* (2013.01); *H04L 43/0876* (2013.01)

(58) Field of Classification Search
CPC ... H04L 63/1425; H04L 69/16; H04L 43/106; H04L 61/6022; G06N 99/005; G06N 7/005
USPC ...................................................... 726/22–25
See application file for complete search history.

(56) References Cited

U.S. PATENT DOCUMENTS

| | | | |
|---|---|---|---|
| 5,748,878 A | 5/1998 | Rees et al. | |
| 8,875,286 B2 | 10/2014 | Friedrichs et al. | |
| 8,914,323 B1 | 12/2014 | Allen et al. | |
| 9,392,017 B2 | 7/2016 | Cui et al. | |
| 9,516,053 B1 * | 12/2016 | Muddu | ................ G06N 99/005 |
| 2009/0271877 A1 | 10/2009 | Bradley | |

(Continued)

FOREIGN PATENT DOCUMENTS

| | | |
|---|---|---|
| WO | 2015/051185 A1 | 4/2015 |
| WO | 2016/020660 A1 | 2/2016 |

OTHER PUBLICATIONS

Attia, "On Device Anomaly Detection for Resource-Limited Systems", SAC' 15 Proceedings of the 30th Annual ACM Symposium on Applied Computing (Apr. 13-17, 2015), pp. 548-554.

(Continued)

*Primary Examiner* — Baotran N To
(74) *Attorney, Agent, or Firm* — Ascenda Law Group, PC

(57) ABSTRACT

A network sensor, inserted into a mirror port of a network switch or router, may be configured to monitor the network traffic originating from an embedded device. Metadata in the network traffic may be passively extracted by the network sensor and transmitted to a server in order to monitor and analyze the behavior of the embedded device. The server may employ machine learning to distinguish typical behavior of the embedded device from atypical behavior. Further, code may be injected into the firmware of the embedded device, and the code may be programmed to broadcast a performance beacon whenever certain firmware functions are executed. A collection of the performance beacons may be analyzed at the server to reconstruct an execution path of the embedded device, and machine learning may be applied to determine whether the execution path is typical or atypical.

20 Claims, 9 Drawing Sheets

(56) References Cited

U.S. PATENT DOCUMENTS

| | | | |
|---|---|---|---|
| 2014/0165207 A1* | 6/2014 | Engel | H04L 63/1425 726/25 |
| 2015/0195296 A1* | 7/2015 | Vasseur | G06N 99/005 726/23 |
| 2015/0373043 A1 | 12/2015 | Wang et al. | |
| 2017/0208079 A1 | 7/2017 | Cammarota et al. | |
| 2017/0279836 A1* | 9/2017 | Vasseur | G06N 99/005 |
| 2018/0027004 A1* | 1/2018 | Huang | H04L 63/1425 726/23 |
| 2018/0115576 A1 | 4/2018 | Ridley | |

OTHER PUBLICATIONS

Attia, "On Device Anomaly Detection for Resource-Limited Systems", Ecole de technologie superieure (ETS), powepoint retrieved Aug. 18, 2016, 46 slides.

Cui; et al., "Defending Embedded Systems with Software Symbiotes", RAID'11 Proceedings of the 14th international conference on Recent Advances in Intrusion Detection (2011), pp. 358-377.

"Dojo Technology", Dojo Labs, accessed Aug. 17, 2016 from: https://www.dojo-labs.com/faq/, 6 pages.

Kane, "Runtime Monitoring for Safety-Critical Embedded Systems", Electrical and Computer Engineering (Feb. 2015), pp. 1-191.

Thomas, "Hardware Monitors for Secure Processing in Embedded Operating Systems", Masters Theses (May 2014), University of Massachusetts, paper 302:1-61.

Watterson; et al., "Runtime verification and monitoring of embedded systems", IET Softw. (2007), 1(5):172-179.

Wolf; et al., "Collaborative Monitors for Embedded System Security", First Workshop on Embedded System Security in conjunction with EMSOFT '06 (Oct. 26, 2006), 6 pages.

Yoon; et al., "SecureCore: A Multicore-based Intrusion Detection Architecture for Real-Time Embedded Systems", Real-Time and Embedded Technology and Applications Symposium (RTAS), 2013 IEEE 19th (Apr. 9-11, 2013), 11 pages.

Zhai; et al., "A Method for Detecting Abnormal Program Behaviour on Embedded Devices", IEEE Transactions on Information Forensics and Security (2015), 10(8):1692-1704.

Non-Final Office Action dated May 18, 2018, for U.S. Appl. No. 15/927,529, filed Mar. 21, 2018, 8 pages.

Non-Final Office Action dated May 18, 2018, for U.S. Appl. No. 15/588,957, filed May 8, 2017, 8 pages.

\* cited by examiner

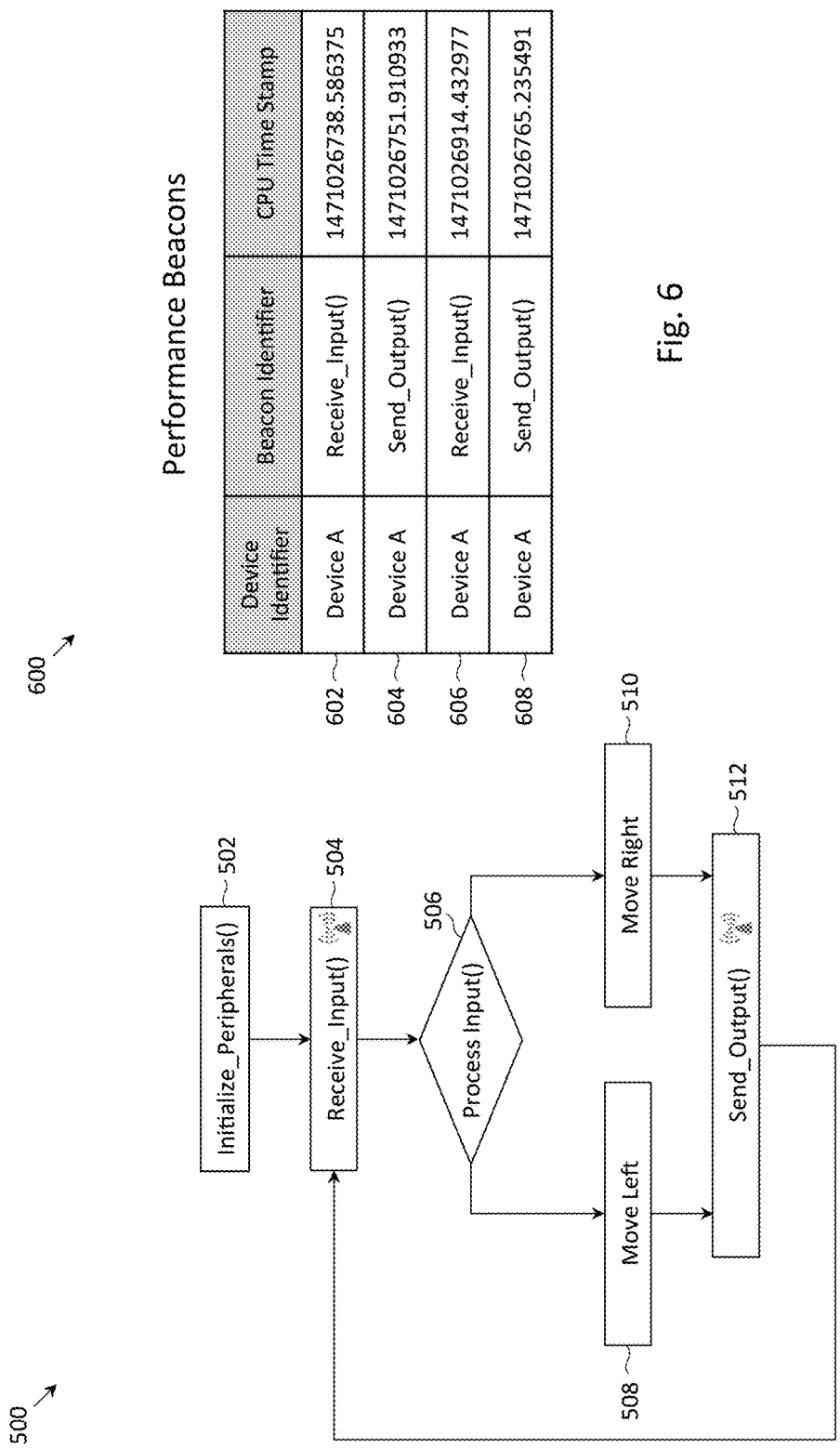

METHODS AND SYSTEMS FOR DETECTING ANOMALOUS BEHAVIOR OF NETWORK-CONNECTED EMBEDDED DEVICES

FIELD OF THE INVENTION

The present invention relates to the monitoring of network-connected embedded devices, and more particularly relates to the detection of the anomalous behavior of embedded devices.

BACKGROUND

Network-connected embedded devices are becoming increasingly widespread in everyday life. Common everyday life objects (e.g., toasters, refrigerators, shoes, etc.) are being equipped with transceivers, allowing the remote control of these objects, as well as the collection and remote analysis of the data generated or sensed by these objects. In fact, the term "Internet-of-Things" has been coined to refer to a network of such embedded devices.

With the advent of such technology comes the challenge of ensuring the proper operation of such embedded devices. Embedded devices can malfunction or fail due to a variety of reasons, some being unintentional (e.g., wear and tear, depletion of battery reserves, etc.), while others being more malicious in nature (e.g., a virus that alters a controller's behavior leading to the overheating of a component, etc.).

Techniques are discussed hereinbelow which allow the behavior of network-connected embedded devices to be monitored (with minimal effort on the part of the user), and further allow any anomalous behavior of the network-connected embedded devices to be detected (also with minimal effort on the part of the user).

SUMMARY OF THE INVENTION

In accordance with one embodiment of the invention, a network sensor may be inserted into a mirror port of a network switch (or router), allowing the network sensor to monitor all (or a portion of) the traffic that flows through the network switch. Such network sensor may be configured to distinguish network traffic originating from embedded devices from network traffic originating from general-purpose devices (e.g., servers, laptop, desktops). The network sensor may then be configured to passively extract metadata (e.g., protocol type, source/destination address, source/destination port, sequence number, etc.) from the network traffic originating from the embedded devices. The metadata may then be transmitted to a server, which allows the server to remotely analyze the behavior of the embedded devices.

In accordance with one embodiment of the invention, a queue instantiated on the server may be created to store the metadata from the network sensor (and in the case where there are multiple network sensors, a queue may be created for each network sensor). By analyzing the metadata over a period of time, a machine learning module instantiated on the server may gradually learn the typical behavior of each of the embedded devices and store a description of the typical behavior in a behavioral profile. For instance, the machine learning module may learn the times at which an embedded device typically transmits data, devices that the embedded device typically communicates with, etc. By analyzing the recent metadata of the network traffic, a behavioral analysis module may monitor the recent behavior of each of the embedded devices. The behavioral analysis module may then compare the monitored behavior of an embedded device with its typical behavior, as captured in its behavioral profile. If the monitored behavior of the embedded device deviates from its typical behavior, a user may be alerted of the atypical behavior of the embedded device.

In accordance with one embodiment of the invention, code may be injected into the firmware of an embedded device, causing the embedded device to transmit performance beacons whenever certain firmware functions are executed. Performance beacons may include an identifier of the embedded device (e.g., MAC address), an identifier of a function that was executed, a CPU time stamp, and a program counter. In one embodiment of the invention, performance beacons may be broadcasted onto a local network, and the network sensor may forward the performance beacons to a server. In another embodiment of the invention, performance beacons may be unicast to a specific network-connected device (e.g., server), removing the need for the network sensor. The server may process a collection of performance beacons transmitted from an embedded device and reconstruct the execution path of the embedded device. Typical execution paths may be learned, and any deviation from such typical execution paths may cause an alert to be sent to a user.

These and other embodiments of the invention are more fully described in association with the drawings below.

BRIEF DESCRIPTION OF THE DRAWINGS

FIG. 5 depicts a flowchart of an algorithm that has been instrumented to transmit performance beacons at various junctures in the algorithm, in accordance with one embodiment of the invention.

FIG. 6 depicts a plurality of performance beacons, in accordance with one embodiment of the invention.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps. While the sequence diagrams each present a series of steps in a certain order, the order of some of the steps may be changed.

Figure 1:
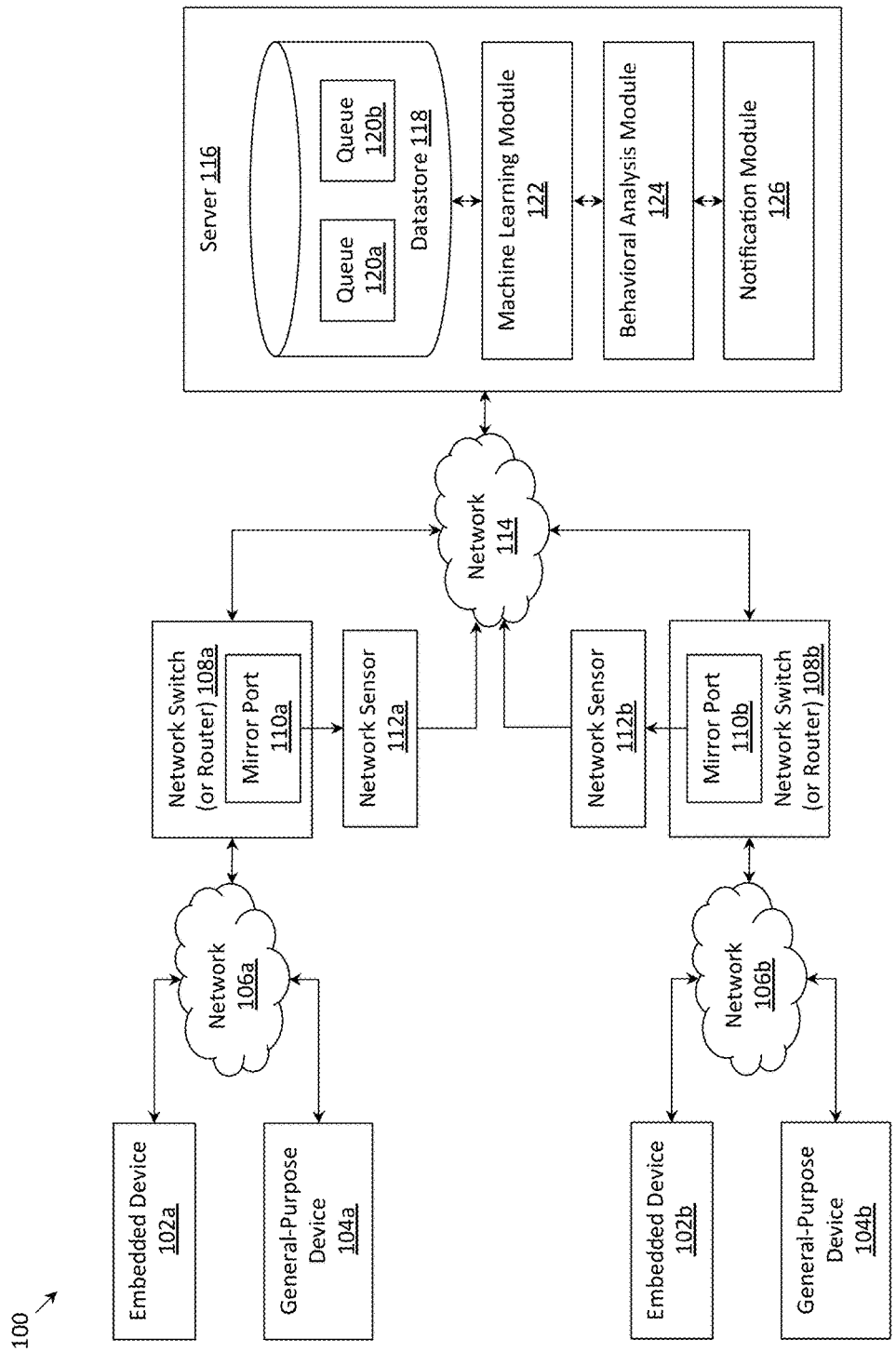
FIG. 1 depicts a system in which the behavior of one or more embedded devices may be monitored by one or more processes that are executed on a server, in accordance with one embodiment of the invention.

FIG. 1 depicts system 100 in which the behavior of one or more embedded devices may be monitored by one or more processes that are executed on a server, in accordance with one embodiment of the invention. Embedded device 102a and general-purpose (computing) device 104a may be communicatively coupled to network 106a. Embedded device 102a may comprise a web-cam, a point-of-sale device, networked medical equipment, an industrial control and supervisory control device, a programmable logic controller (PLC), a power management device, a security camera, a printer, a networked embedded device, an unmanned embedded device, a sparsely manned embedded device, or another Internet-of-Things (IOT) device. In some cases, an embedded device is programmed to run a single application (i.e., software that is dedicated for one purpose). In some cases, the instructions which control the operation of an embedded device is known as firmware and such instructions are stored on non-volatile memory (e.g., ROM, EPROM, EEPROM, or flash memory) of the embedded device. In many cases, firmware is loaded on an embedded device only once in the lifetime of the embedded device (i.e., the firmware that is resident on an embedded device is rarely updated).

General-purpose device 104a may comprise personal computers (PCs), laptops and servers. Such general-purpose device is typically capable of executing a plurality of applications (sequentially or in parallel), and the installation of new applications and the deletion of old applications from the general-purpose device are fairly routine operations. One distinction between general-purpose devices and embedded devices is that general-purpose devices can be easily reconfigured (e.g., easily in the sense that a software wizard may be provided to guide a user through the reconfiguration process), while this is not so for embedded devices (e.g., a user may need to know specific programming languages, may need to know how to compile a program to run on a specific hardware platform, etc.). Another distinction is that general-purpose devices are expected to have a wider range of behaviors than embedded devices. For example, a server may assist a user deposit a check, stream a movie, purchase a book, locate a patent from a database, rank a collection of webpages, etc. In contrast, the behavior of a wireless scale (which is an example of an embedded device) is expected to be fairly limited (e.g., turn on, initialize weight to zero, measure weight, wirelessly transmit weight, etc.) The more limited range of behaviors for embedded devices is one reason why embedded devices are specifically chosen as the targets of the monitoring described herein (i.e., the limited range of behavior permits an embedded device to be characterized with a set of typical behaviors, and accordingly allows the identification of behavior which deviates from the set of typical behaviors).

It is noted that the distinction between embedded devices and general-purpose devices may not be that clear in some cases. For instance, a smart phone (e.g., an iPhone™) possesses some attributes that would be characteristic of an embedded device (e.g., software dedicated for making phone calls), while it also possesses other attributes that would be characteristic of a general-purpose device (e.g., ability to run a variety of software applications). In one embodiment of the invention, smart phones may be categorized as embedded devices, and the monitoring discussed herein may be applied to smart phones. In an alternative embodiment, smart phones may be categorized as "hybrid devices" (i.e., a hybrid between an embedded device and a general purpose device), and the monitoring system may provide the user with a choice of either monitoring or not monitoring hybrid devices". Further, while only one embedded device and one general purpose device have been depicted as being communicatively coupled to network 106a, more generally, one or more embedded devices and one or more general-purpose devices may be communicatively coupled to network 106a.

Network switch 108a (which may also be a router) may be communicatively coupled to network 106a and network 114. Network switch 108a may receive network packets (or more generally, network traffic) from network 106a and forward the packets to network 114 or another network (not depicted). Similarly, network switch 108a may receive network packets from network 114 and forward the network packets to network 106a. Network switch 108a may include a mirror port 110a that sends a copy of the network packets that are received or transmitted from another port of network switch 108a (e.g., port which is connected to network 106a or port which is connected to network 114) to network sensor 112a. In the present case, the network packets that are of interest are those from network 106a (i.e., outbound from network 106a to network switch 108a), so mirror port 110a may be configured to send network sensor 112a a copy of all the network packets that are received from network 106a, but not network 114. Examples of mirror ports include a switched port analyzer (SPAN) port, a remote switch port analyzer (RSPAN) port, or a roving analysis port (RAP).

Network sensor 112a may be configured to inspect the network packets received from mirror port 110a in order to distinguish network packets that are transmitted by embedded device 102a from network packets that are transmitted by general-purpose device 104a. In most cases, there will be no metadata in a network packet that explicitly identifies the network packet as originating from an embedded device. Therefore, network sensor 112a will need to infer whether a network packet originates from an embedded device based on the metadata that is present in a network packet. Such metadata may include the Internet protocol (IP) addresses (e.g., source and/or destination IP address) and media access control (MAC) addresses (e.g., source MAC address). For instance, if the destination IP address of a network packet is identified to be associated with a manufacturer of a web-cam, that network packet may be inferred to originate from a web-cam (which is an embedded device). As another example, if the MAC address (i.e., source MAC address) of a network packet is identified to be associated with an automobile parts manufacturer (e.g., via a table that maps MAC addresses to enterprises), that network packet may be inferred to originate from an embedded device. As another example, an operating system may be inferred from an analysis of TCP signatures, and a determination of whether a device is an embedded device may be made based on the type of operating system of the device. More generally, a table may store a mapping from certain metadata (e.g., IP address, MAC address) to an indication of whether a device that sent a packet with that metadata is likely to be an embedded device, likely to be a general purpose device, or likely to be a hybrid device. Such table may be stored at network sensors 112a/112b (in which case updates to the table may need to be periodically pushed from a centralized database) or may be stored at a centralized location (e.g., server 116) and referenced by network sensors 112a/112b when needed.

Figure 2:
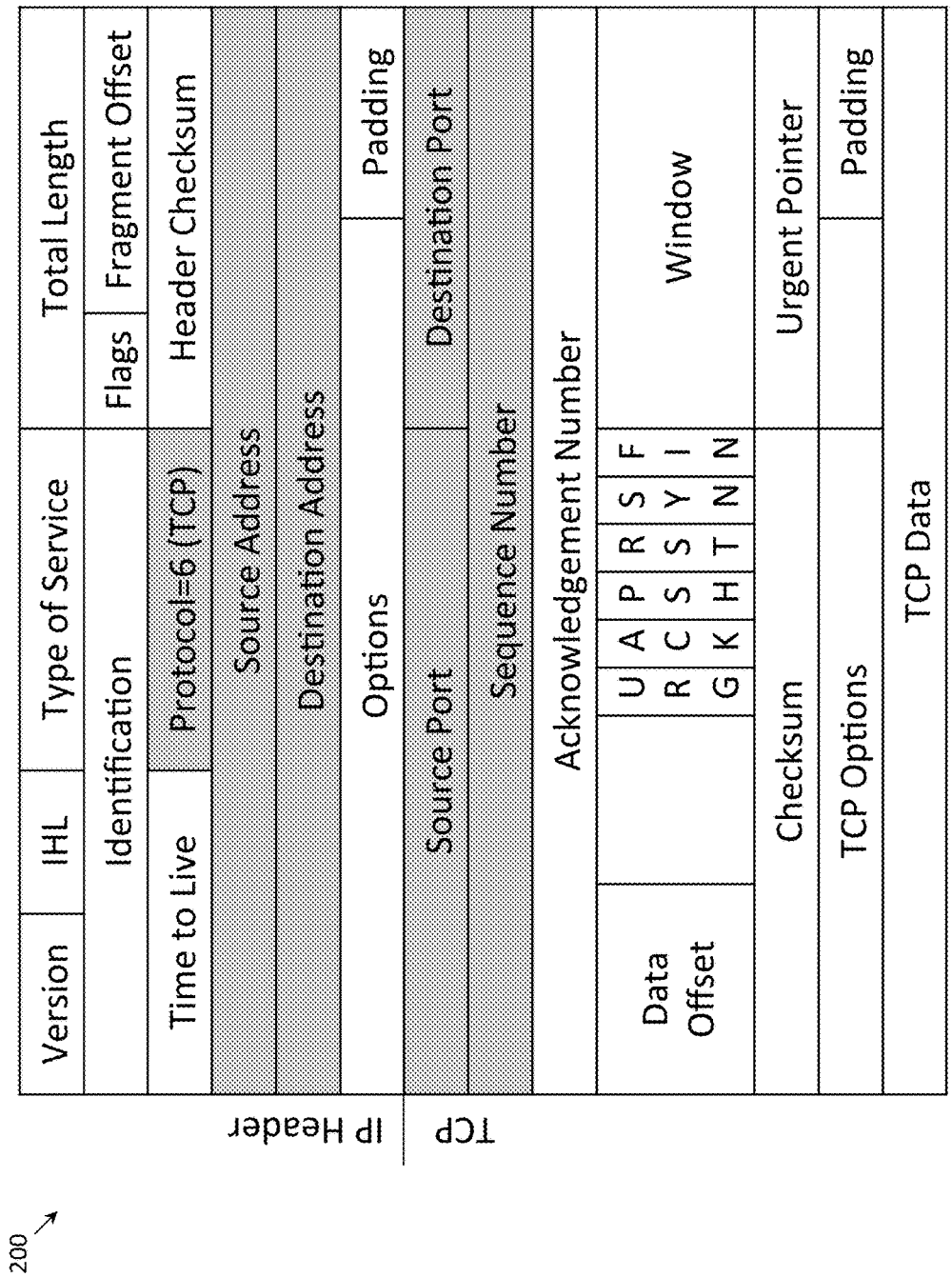
FIG. 2 depicts various portions of a TCP/IP packet, including metadata that may be monitored by a network sensor, in accordance with one embodiment of the invention.

Once network sensor 112a determines a network packet to be associated with an embedded device, network sensor 112a may passively extract (e.g., monitor network traffic on network 106a without transmitting signals onto network 106a) and transmit certain metadata from that network packet to server 116 for further analysis. The metadata of interest may include the protocol identifier, source address, and destination address of the Internet protocol (IP) header, as well as the source port, destination port and sequence number of the transmission control protocol (TCP) header. See, e.g., FIG. 2, which depicts the structure 200 of a network packet with the metadata of interest displayed in a shaded manner.

In terms of the Open Systems Interconnection (OSI) model, metadata from domain name system (DNS) traffic in Layer 5, metadata from Layer 4 and metadata from Layer 3 packets may be collected. For the DNS traffic at Layer 5, the DNS names of hosts (e.g., IP addresses and DNS names of Facebook™, Amazon™, and Apple™ update server) that are contacted by an embedded device may be collected. At the Layer 4 transport level, TCP/IP packet length, time stamp, sequence number, flags, destination IP and source IP may be collected. At the Layer 3 network level, MAC addresses may be collected. In one embodiment of the invention, no deep packet inspection is employed by network sensor 112a (i.e., the TCP data is not collected by network sensor 112a), greatly reducing the processing load of the network sensor, as well as potentially making the monitoring of network traffic compatible with payment card industry (PCI) and health insurance portability and accountability act (HIPAA) requirements.

In one embodiment of the invention, a first connection of network sensor 112a may be used to receive the mirrored network traffic, while a second connection (e.g., a dynamic host configuration protocol (DHCP) connection) may be used to transmit the extracted metadata to server 116 for further analysis. Such a network sensor may be known as a "multi-homed device", because it is connected to two networks (i.e., network 106a and network 114). In another embodiment of the invention (not depicted), network sensor 112a may only be connected to mirror port 110a, and such connection may be used by network sensor 112a to both receive the mirrored network traffic as well as transmit the network traffic metadata to server 116.

In a hardware embodiment, network sensor 112a may be a self-contained device (with a processor and data storage elements) that is inserted into mirror port 110a, while in a software embodiment (not depicted), network sensor 112a may be a software module that is installed on general-purpose device 104a, 104b (or other general-purpose device, not depicted) or server 116 (or another server, not depicted). For example in the software embodiment, network sensor 112a may be available as a software installer, virtual machine or pre-installed appliance). In another hardware embodiment (not depicted), network sensor 112a may be a physical device (with a processor and data storage elements) that is integrated into network appliance, such as a wireless Access Point or network switch 108a.

FIG. 1 also depicts network sensor 112b connected to mirror port 110b of network switch 108b, and network sensor 112b is configured to monitor the outbound traffic from network 106b. Embedded device 102b and general-purpose device 104b may be communicatively coupled to network 106b, and network packets generated by these devices may be inspected by network sensor 112b in order to distinguish network packets that are transmitted by embedded device 102b from network packets that are transmitted by general-purpose device 104b (similar to the functionality of network sensor 112a).

As illustrated in FIG. 1, one network sensor may be employed to monitor the outbound traffic of each network (e.g., each local network). In one embodiment of the invention, each of network 106a and network 106b is located in its own local geographical area (e.g., network 106a is located in a building occupied by enterprise A, and network 106b is located in a building occupied by enterprise B). In such case, the network sensor may be called an "on-premises" or "on-prem" sensor (i.e., sensor that is located in the same geographical area as the network that is being monitored).

The metadata extracted by network sensors 112a and 112b may then be transmitted via network 114 to server 116. It is noted that in one embodiment of the invention, metadata of the network traffic is the only information transmitted from network sensor 112a and 112b to server 116. At server 116, the metadata may be stored in datastore 118. More specifically, the metadata extracted by network sensor 112a may be stored in queue 120a and the metadata extracted by network sensor 112b may be stored in queue 120b (both queues instantiated in datastore 118). Further, the metadata in the queues may be tagged with an identifier of each of the embedded devices (e.g., MAC address), allowing an analysis of the metadata to reveal the behavior (whether normal or atypical) of each of the embedded devices.

Machine learning module 122 (instantiated at server 116) may be configured to construct a behavioral profile for embedded device 102a (102b) based on the metadata stored in queue 120a (120b), respectively. In one embodiment of the invention, machine learning module 122 may be named Machine Automation Learning and Intuition Architecture (MALTA). Each of the behavioral profiles may be constructed over an extended period of time (e.g., a day, a week, a month), until the behavioral profile adequately captures the typical behavior of the corresponding embedded device. Further, behavioral profiles may be continually updated to reflect the changing behavior of the embedded devices. In one embodiment of the invention, a behavioral profile may be represented as a vector of values, where each of the values represents a statistical "average" or statistical "cluster" of previous observations.

Behavioral analysis module 124 (instantiated at server 116) may be configured to compare a monitored behavior of each of the embedded devices (e.g., recently observed behavior) with its typical behavior as captured in its behavioral profile. In some cases, such comparison involves comparing an observation from a single point in time (i.e., the monitored behavior) to a history of previous observations (i.e., the typical behavior) in order to obtain a numerical "sameness" between the monitored behavior and the typical past behavior. The monitored behavior of an embedded device may be determined from the metadata of that embedded device which has been collected at one of the queues. If the monitored behavior of an embedded device deviates from its typical behavior, a notification module (instantiated at server 116) may be configured to send a notification to a user, alerting the user that the behavior of a particular embedded device deviated from its typical behavior and/or further notifying the user the behavior that was identified to be atypical. Such an alert may be transmitted to a computing device of a user communicatively coupled to network 106a, network 106b, network 114 or another network (not depicted). Further details of machine learning module 122, behavioral analysis module 124 and notification module 126 are provided below in FIG. 3.

Figure 3:
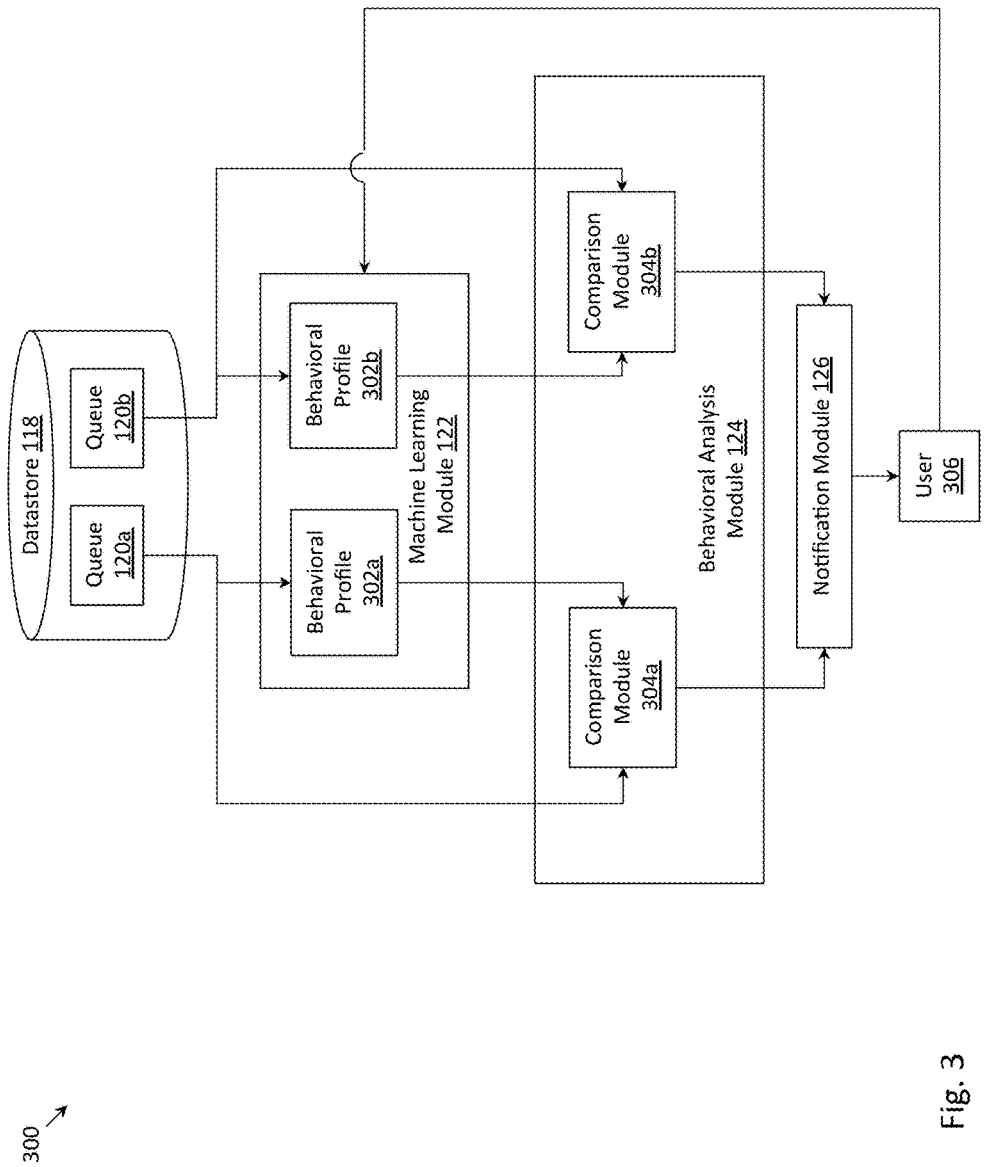
FIG. 3 depicts a system including various software modules and storage elements that are configured to analyze the behavior of one or more embedded devices, in accordance with one embodiment of the invention.

FIG. 3 depicts system 300 including various software modules and storage elements that are configured to analyze the behavior of one or more embedded devices, in accordance with one embodiment of the invention. As described above, a plurality of queues may be instantiated at datastore 118, each queue corresponding to a network sensor. Machine learning module 122 may retrieve the metadata stored in one of the queues, determine the embedded device from which the metadata originated, and construct (or update) a behavioral profile of the embedded device based on the metadata. All or more of the following may be used to construct an algorithmic representation of the behavioral profile of the embedded device: supervised and unsupervised machine learning (including but not limited to decision tree, Naive Bayes, stochastic gradient descent, support vector machine, and K-Means). In the example of FIG. 3, behavioral profile 302a is constructed for embedded device 102a based on the metadata stored in queue 120a, and behavioral profile 302b is constructed for embedded device 102b based on the metadata stored in queue 120b. In one embodiment of the invention, a behavioral profile may comprise a state machine (e.g., modeling the operation states of an embedded machine, the average time resident in each of the states, the probability of transitioning from one state to another, etc.).

Behavioral analysis module 124 may comprise one or more comparison modules (e.g., comparison module 304a, 304b). Comparison module 304a is configured to compare the recent behavior of embedded device 102a (as determined from the metadata stored in queue 120a) with the typical behavior of embedded device 102a (as reflected in behavioral profile 302a). Similarly, comparison module 304b is configured to compare the recent behavior of embedded device 102b (as determined from the metadata stored in queue 120b) with the typical behavior of embedded device 102b (as reflected in behavioral profile 302b). The comparison methodologies of the recent behavior to the typical behavior may be performed via statistical classification provided by machine learning algorithms (e.g., decision tree, Naive Bayes, stochastic gradient descent, support vector machine, and K-Means). For each recent behavior of embedded device 102a, a vectorized representation of the metadata may be provided to all of the machine learning algorithms that are selected for a certain type of embedded device. Each machine learning algorithm may respond to the vectorized representation of the metadata with either a scalar value which represents the statistical "closeness" to the typical behavior of the embedded device or a binary classification of "in class" or "out of class". The output of each of the machine learning algorithms may be weighted depending on an estimated reliability of the respective machine learning algorithm output, and the weighted outputs may be aggregated in the form of a vector. If the recent behavior deviates from the typical behavior (as described above), the occurrence of such an event may be transmitted to notification module 126, which in turn notifies user 306 of the occurrence of the atypical behavior and/or the behavior that was atypical.

In some instances, user 306 may conclude that the atypical behavior is not actually malicious or suspicious in nature (e.g., the atypical behavior was due to a software upgrade, the introduction of a new feature, etc.), and in such cases, the user may provide such feedback to machine learning module 122. The machine learning module, in turn, may be updated to re-categorize the atypical behavior as typical (e.g., adding a new state to a state machine). If, however, the user confirms that the monitored behavior is in fact atypical, the user may take the appropriate measures to address the potential problem (e.g., take the embedded device offline for troubleshooting, perform calibration on embedded device, etc.).

As a simplified example, suppose the behavioral profile of a wireless scale included two vectors. Vector 1=[source MAC=00:0a:95:9d:69:16, packet length=1 k, source IP=172.16.254.1, source port=30, destination IP=211.11.123.2, destination port=20, time stamp=12:24:11], while vector 2=[source MAC=00:0a:95:9d:69:16, packet length=2 k, source IP=172.16.254.1, source port=30, destination IP=211.11.123.2, destination port=15, time stamp=02:02:01]. Further, suppose that machine learning module 122 is able to infer that vector 1 is associated with the transmission of a measured weight, and vector 2 is associated with the request for calibration information. If the vectorized representation of the metadata collected for the wireless scale were [source MAC=00:0a:95:9d:69:16, packet length=1 k, source IP=172.16.254.1, source port=30, destination IP=211.11.123.2, destination port=20, time stamp=12:23:16], behavioral analysis module 124 may recognize that such vectorized metadata is sufficiently similar to vector 1 (i.e., all fields of the vectorized metadata are identical to the fields of vector 1, except for the time stamp, which is within one minute of the time stamp of vector 1), and infer that the current behavior of the wireless scale is the transmission of a measured weight.

On the other hand, if the vectorized representation of the metadata collected for the wireless scale were [source MAC=00:0a:95:9d:69:16, packet length=100 k, source IP=172.16.254.1, source port=30, destination IP=123.14.222.10, destination port=50, time stamp=05:12:11], behavioral analysis module 124 may determine that such vectorized metadata is not sufficiently similar to either vector 1 or vector 2 (i.e., none of the fields of the vectorized metadata are equal or even close to any of the corresponding fields of vector 1 or vector 2). As a result, behavioral analysis module may conclude that the behavior of the embedded device deviates from the typical behavior of the embedded device and may send an alert to notification module 126.

Sufficiency of similarity between vectorized representations of metadata may be determined in a variety of fashions, and may be made on a constituent-by-constituent or a vector-by-vector basis. For example, individual constituent of a vectorized representation of metadata may be compared, constituent-by-constituent, where sufficiency of similarity on a constituent-basis varies between constituents. In some instances, similarity for a given constituent may involve a significant deviation from a specified norm. In other cases, little or no such variation may be permitted. Likewise, in a vector-by-vector comparison (say a using a dot product between a vectorized representation of recently collected metadata and a vectorized representation of typical behavior as captured in a behavioral profile) significant, some, or no deviations from the typical behavior may be permissible.

In one embodiment of the invention, server 116 (or portions thereof) may be deployed as a single-tenant Amazon Web Services (AWS)™ instance. For example, one AWS instance may be used to monitor the embedded devices of one enterprise, while another AWS instance may be used to monitor the embedded devices of another enterprise (with the advantage of keeping the data of different enterprises separate from one another).

Figure 4:
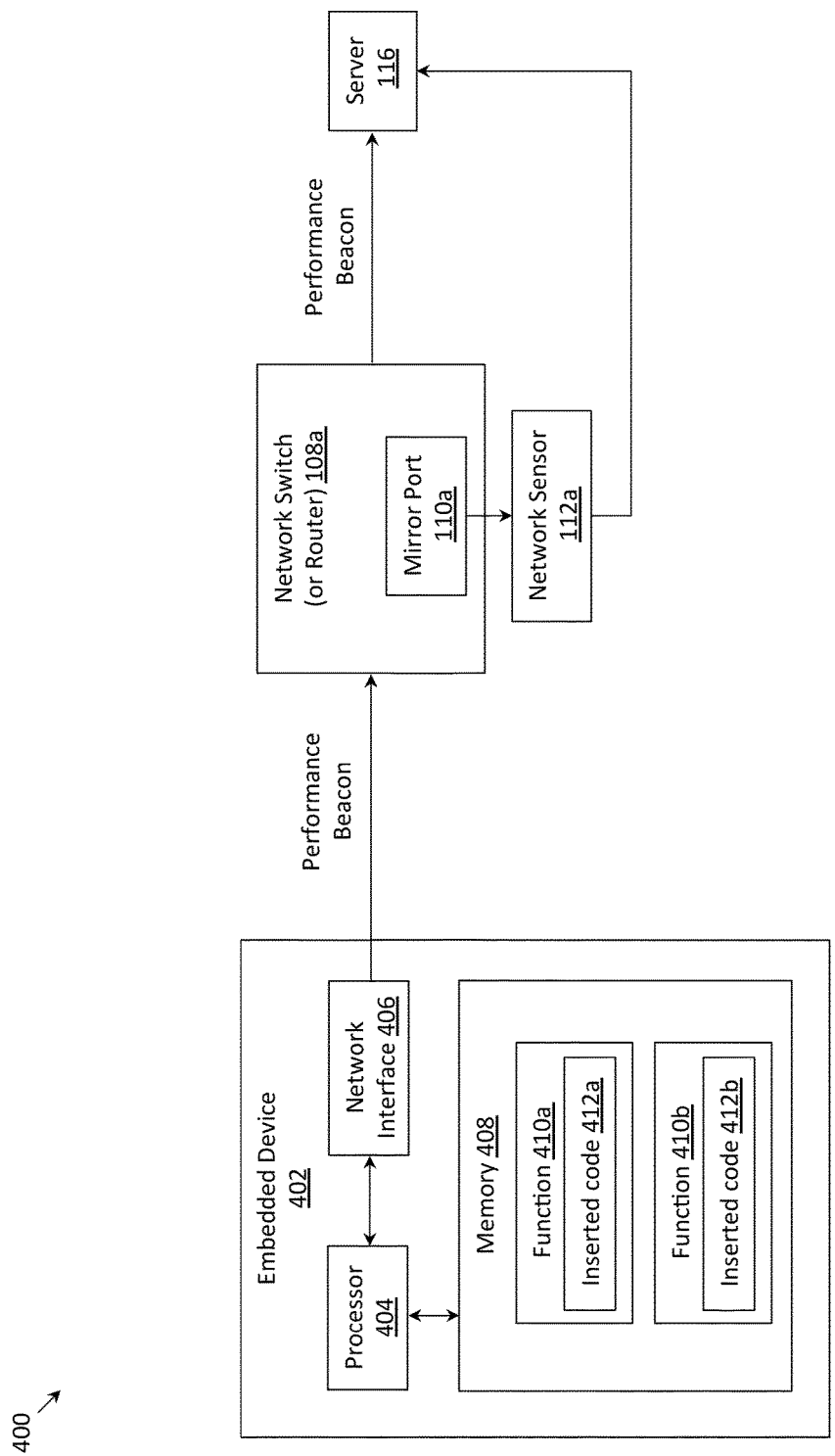
FIG. 4 depicts a system including an embedded device that is configured to transmit performance beacons to a server, in accordance with one embodiment of the invention.

FIG. 4 depicts system 400 in which an embedded device 402 is configured to transmit performance beacons to server 116, in accordance with one embodiment of the invention. Embedded device 402 may be representative of embedded devices 102a and/or 102b, and may comprise processor 404, network interface 406 and memory 408. If not already apparent, memory 408 may comprise any non-volatile memory (e.g., EPROM, EEPROM, flash memory), battery-backed volatile memory (e.g., DRAM, SRAM), or any other data storage device.

Stored within memory 408 may be computer-readable instructions, which when executed by processor 404 cause processor 404 to perform functions 410a and 410b. Each of functions 410a and 410b may be a firmware function (i.e., a function present in firmware). While two functions have been depicted for simplicity, it is understood that more (or fewer) functions may be present in practice. Code 412a may be inserted (or injected) into function 410a, and code 412b may be inserted (or injected) into function 410b.

Whenever function 410a (or function 410b) is executed, code 412a (or code 412b) is configured to generate a performance beacon that is wirelessly transmitted from embedded device 402 via network interface 406. In one embodiment, performance beacons may be received by network switch 108a, which forwards the performance beacons to server 116 (without the involvement of a network sensor). In an alternative embodiment, performance beacons may be received by network switch 108a, transmitted to network sensor 112a via mirror port 110a, and then transmitted to server 116 via network sensor 112a.

For clarity, it is noted that such approach of wirelessly transmitting performance beacons is distinct from a debug mode of operation, in which a probe is connected to the debug port of an embedded device and status messages are received from the debug port. In the latter approach, a person would need to be physically present to insert a probe into a debug port, while in the former approach, a person need not be present at the same location as the embedded device. Further, a debug port may not even be present on the embedded device of the former approach.

A performance beacon may include one or more of a MAC address of embedded device 402 (used to identify the device that sent the performance beacon), a program counter value of processor 404 when the performance beacon was generated (used to understand where the firmware was executing in memory), a tick count of processor 404 when the performance beacon was generated (used to build a chronology of the operations), or a stack value of processor 404 when the performance beacon was generated (which provides finer resolution when determining the state of the firmware execution). In addition, counter values produced by counters instantiated by the inserted code may be transmitted along with the program counter that (when combined with the processor tick count) assist with the reconstruction of the chronology of the transmitted performance beacons. The reconstruction of the chronology may be necessary when using UDP to transmit beacons, as UDP transmission may cause packets to be received in an order different from the order in which they were transmitted.

A collection of performance beacons (generated in response to the execution of a plurality of functions) may be used by server 116 to reconstruct the execution path of embedded device 402 (e.g., build a tree of execution flow of the firmware). The typical execution path of embedded device 402 may be learned over time (e.g., by machine learning module 122). The recent execution path of embedded device 402 may be compared to its typical execution path, allowing server 116 to identify whether the recent behavior of embedded device 402 is typical or atypical.

In one embodiment of the invention, code 412a and 412b may be developed by a first enterprise that provides the behavioral analysis services at server 116, and functions 410a and 410b may be developed by a second enterprise that manufactures embedded device 402. Code 412a (and code 412b) may be inserted into function 410a (and function 410b) by a software developer of the second enterprise, and the "instrumented code" may be installed on embedded device 402. For the convenience of the software developer, the inserted code may be very short in length (e.g., a single line, a code snippet, etc.), and the inserted code, when executed by processor 404, may be configured to invoke a routine (e.g., stored in a library) that causes the performance beacon to be transmitted. In the instance where the aforementioned routine is stored in a library, the library would also be stored on memory 408.

It is noted that FIG. 4 has been simplified for ease of illustration. In a more complete version of FIG. 4, network 106a would communicatively couple embedded device 402 to network switch 108a. Similarly, network 114 would communicatively couple network switch 108a to server 116. In one embodiment, performance beacons may be broadcasted to a broadcast address of network 106a in an unencrypted form using the user datagram protocol (UDP). Unencrypted communication has the benefit of reduced processing for the embedded device, and UDP has the benefit of avoiding the overhead of the TCP handshake. The broadcast of the performance beacons (as compared to the unicast of same) provides greater flexibility in the deployment of the embedded device. For example, any device can be configured to monitor the performance beacons without any additional change to the firmware of the embedded device (i.e., after the embedded device has been deployed with the inserted code (412a, 412b), no additional change to the firmware is needed).

Network sensor 112a would then be employed to forward the performance beacons to server 116. In an alternative embodiment, performance beacons may be unicast to server 116, avoiding the need for network sensor 112a to forward the performance beacons to server 116.

In one embodiment of the invention, performance beacons may be "always on", meaning that performance beacons are always transmitted, regardless of whether any device is present to receive and process the performance beacons. In an alternative embodiment, an embedded device may be activated to transmit performance beacons when needed. For example, a toggle switch might be present on the embedded device that allows a user to activate the transmission of performance beacons only when the performance beacons are being monitored. The latter embodiment may be useful for "untethered" embedded devices in which low power operation is essential.

In one embodiment of the invention, only a subset of the functions stored on memory 408 is instrumented to generate performance beacons. Criteria for selecting which functions to instrument include the frequency that a function is called (e.g., functions that are called very frequently may not be good candidates as this may lead to performance beacons flooding the network), the sequence in which functions are called (e.g., it may be desirable to instrument a function that is called upon the successful execution of a series of functions), and the predictability that a function is called (e.g., it may not be desirable to instrument a function that is repeatedly executed with a set period). Further, it may be desirable to instrument functions that only execute during boot, functions that execute under "edge cases", functions that open files, functions that communicate with the network, functions that call library routines, and functions tied to the business logic of firmware. Generally, it is recommended to instrument functions that provide a good snapshot of the operational health of an embedded device.

To further describe performance beacons, FIG. 5 depicts flowchart 500 of an algorithm that has been instrumented to transmit performance beacons at various junctures in the algorithm, in accordance with one embodiment of the invention. Flowchart 500 may be an excerpt of a firmware program executing on a programmable logic controller (PLC), or a robotic arm. At step 502, the algorithm may initialize peripherals (e.g., move arms to initial position, clear buffers, etc.). At step 504, the algorithm may receive input (e.g., an obstacle being sensed). The wireless antenna symbol in step 504 illustrates that the "receive input" function has been configured to transmit a performance beacon whenever the "receive input" function is executed. At step 506, the received input may be processed. In response to the processed input, a robotic arm may move left (step 508) or move right (step 510). At step 512, the algorithm may send an output (e.g., transmit meter data or telemetry data). The wireless antenna symbol in step 512 similarly illustrates that the "send output" function has been configured to transmit a performance beacon whenever the "send output" function is executed. The algorithm may return to step 504 following step 512.

FIG. 6 depicts performance beacons 600, in accordance with one embodiment of the invention. Each row of the table may record a performance beacon comprising a device identifier (e.g., an identifier of the embedded device that transmitted the performance beacon), a beacon identifier (e.g., a value that uniquely identifies the beacon location in the firmware and hence the function being executed within the firmware), and a CPU time stamp (e.g., the CPU time when the function was executed), which may also be called a "tick count". For example, the first row of the table 602 records a performance beacon with the device identifier of "device A", the beacon identifier of "receive input", and the CPU time stamp of 1471026738.586375. Based on an increasing order of the CPU time stamps, the performance beacons may be determined to have been transmitted from an embedded device in the following order: 602, 604, 608 and 606. From such sequence of performance beacons, the execution path of the embedded device may be inferred to be "receive input", "send output", "send output", followed by "receive input".

If not already apparent, it is noted that performance beacons and the above-described network traffic metadata are two different types of information which may both serve the similar purpose of analyzing the behavior of network-connected embedded devices. Performance beacons may reveal lower level operational details of an embedded device (e.g., which firmware functions were called, in what order, etc.), whereas network traffic metadata may reveal higher level operational details (e.g., how often network packets were transmitted, where the network packets were transmitted to, etc.). In other words, performance beacons in most cases should not be understood as a type of network traffic metadata, but rather as a class of information distinct from network traffic metadata.

Figure 7:
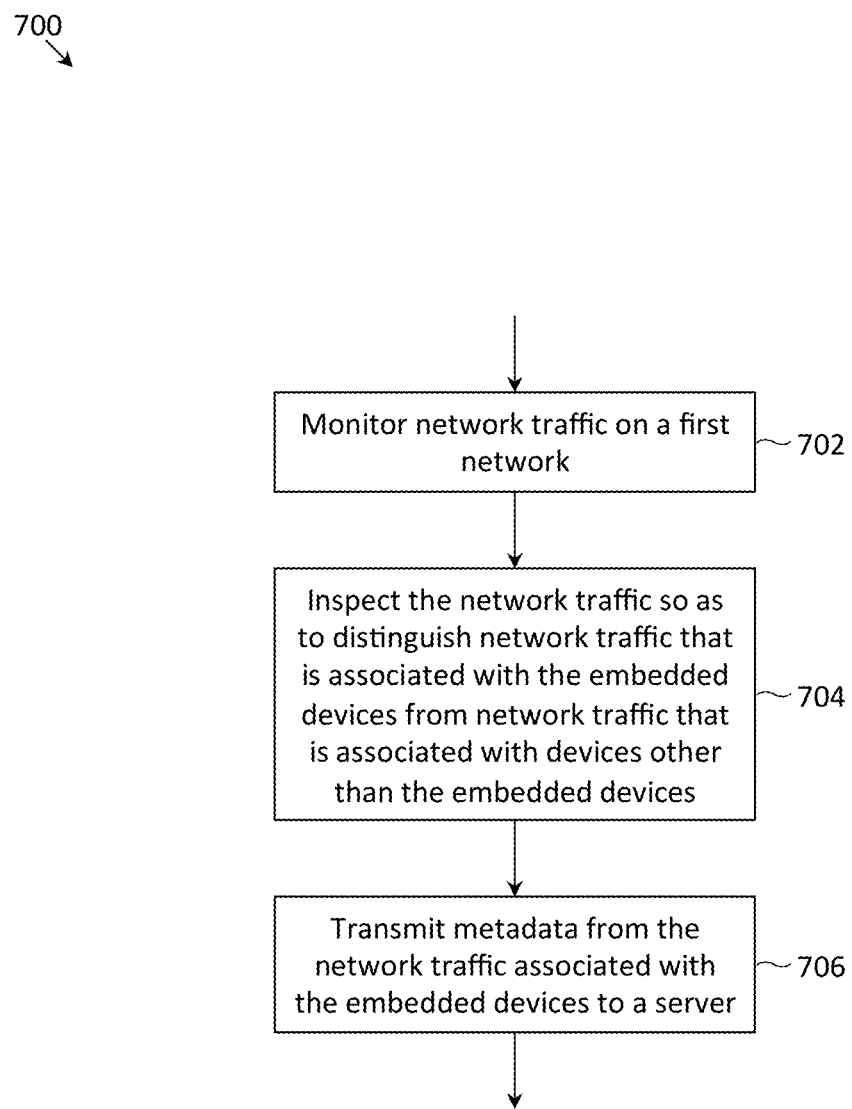
FIG. 7 depicts a flowchart of a process for collecting metadata from the network traffic of one or more embedded devices and transmitting the collected metadata to a server, in accordance with one embodiment of the invention.

FIG. 7 depicts flowchart 700 of a process for collecting metadata from the network traffic of one or more embedded devices and transmitting the metadata to a server, in accordance with one embodiment of the invention. At step 702, the network sensor may monitor network traffic on a first network, the first network including one or more embedded devices and one or more general-purpose devices. The network traffic may comprise data packets, and each data packet may contain metadata that is encapsulated in a packet header. At step 704, the network sensor may inspect the network traffic so as to distinguish network traffic that is associated with the embedded devices from network traffic that is associated with devices other than the embedded devices. The network sensor may rely upon one or more of IP addresses of the network traffic or MAC addresses of the network traffic in order to identify traffic originating from embedded devices. At step 706, the network sensor may transmit metadata from the network traffic associated with the embedded devices to a server. Such metadata may include one or more of the TCP/IP packet length, time stamps, sequence numbers, flags, destination IP addresses, source IP addresses, destination port addresses, source port addresses, or the MAC addresses of data packets.

Figure 8:
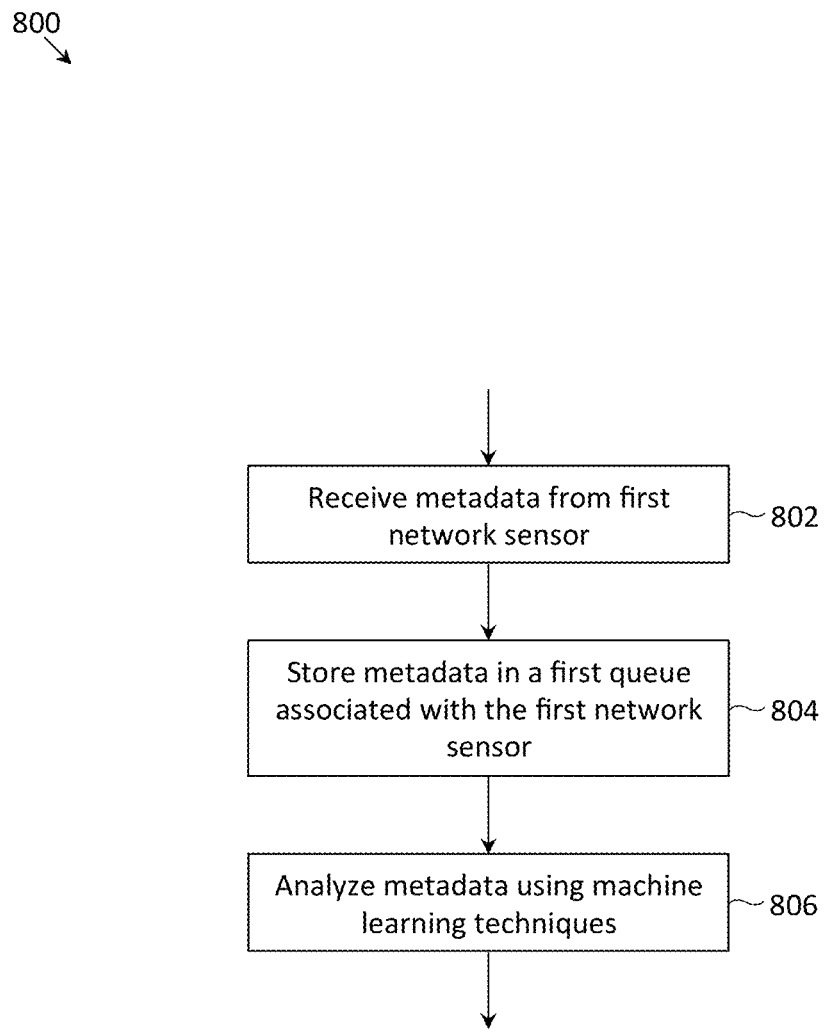
FIG. 8 depicts a flowchart of a process for analyzing the behavior of one or more embedded devices, in accordance with one embodiment of the invention.

FIG. 8 depicts flowchart 800 of a process for analyzing the behavior of one or more embedded devices, in accordance with one embodiment of the invention. At step 802, a server may receive metadata from a first network sensor. At step 804, the server may store the metadata in a first queue associated with the first network sensor. In the case where there are multiple network sensors, a queue may be created for each of the network sensors. At step 806, the server may analyze the metadata using machine learning techniques in order to detect anomalous behavior of the one or more embedded devices. Step 806 is further described below in FIG. 900.

Figure 9:
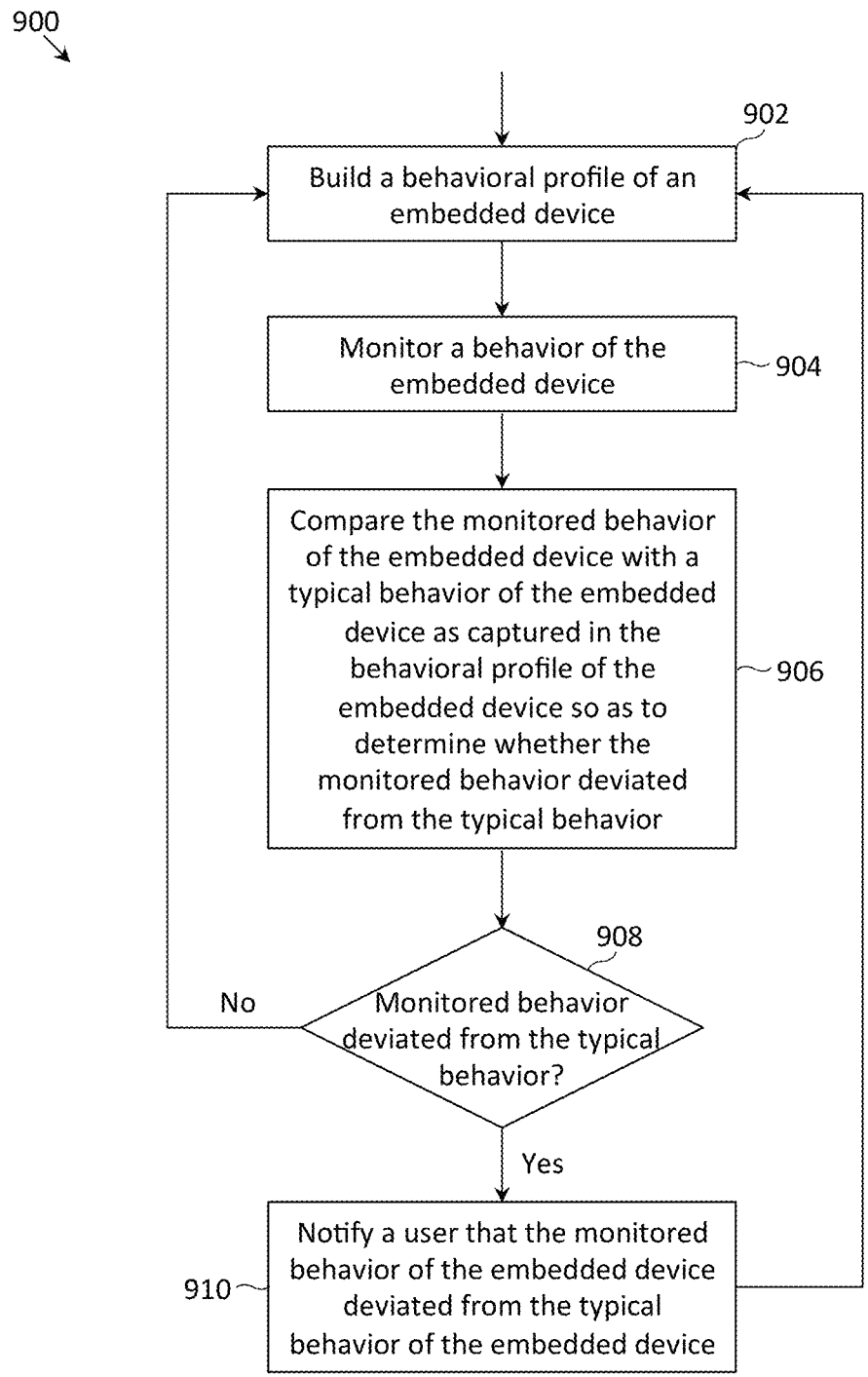
FIG. 9 depicts a flowchart of a process for comparing a recent behavior of an embedded device to a typical behavior of the embedded device, in accordance with one embodiment of the invention.

FIG. 9 depicts flowchart 900 of a process for comparing the recent behavior of an embedded device to the typical behavior of the embedded device, in accordance with one embodiment of the invention. At step 902, a machine learning module may build a behavioral profile of an embedded device based on metadata that has been collected from the network traffic of the embedded device. As described above, supervised and unsupervised machine learning (including but not limited to decision tree, Naive Bayes, stochastic gradient descent, support vector machine, and K-Means) may be employed to generate the behavioral profile. At step 904, a behavioral analysis module may monitor the behavior of the embedded device based on metadata that has been recently collected from the network traffic of the embedded device. For example, a certain sequence or collection of metadata may be recognized as being associated with a certain behavior, and a vectorized representation of the metadata may be formed corresponding to the recognized behavior. At step 906, the behavioral analysis module may compare the monitored behavior of the embedded device (e.g., metadata organized in a vectorized representation) with a typical behavior of the embedded device as captured in the behavioral profile of the embedded device so as to determine whether the monitored behavior deviated from the typical behavior.

At step 908, the behavioral analysis module may determine whether the monitored behavior deviated from the typical behavior. If so, a notification module may notify a user via a web-based interface, email or a text message that the monitored behavior of the embedded device deviated from the typical behavior of the embedded device (step 910). At step 910, the notification module may further provide some context of the embedded device (e.g., input from sensors), so that the user may be able to infer the root cause of the atypical behavior. At step 910, the notification module may further provide actionable insights (e.g., requesting a user to change batteries, clean a sensor, etc.). While not depicted in FIG. 9, it is understood that following step 910 the user, in some instances, may provide feedback to the machine learning module which informs the machine learning module that a behavior of an embedded device was improperly categorized as atypical, allowing the machine learning module to adjust the typical behaviors that are stored in the behavioral profile. In either the "NO" branch of step 908 or the conclusion of step 910, the process may continue with the machine learning module continuing to build the behavioral profile of the embedded device. While flowchart 900 was discussed in the context of a single embedded device, it is understood that flowchart 900 may be independently performed for each embedded device.

While the embodiments described above have solely focus on monitoring the behavior of embedded devices, a greater degree of freedom in selecting the devices to monitor (or to not monitor) is provided in another embodiment. For instance, a user could be provided with a complete list of devices on network 106*a* that have been detected by network sensor 112*a*, and the user is provided the ability to select one or more of the detected devices (possibly including general-purpose devices) that should be monitored by server 116.

Figure 10:
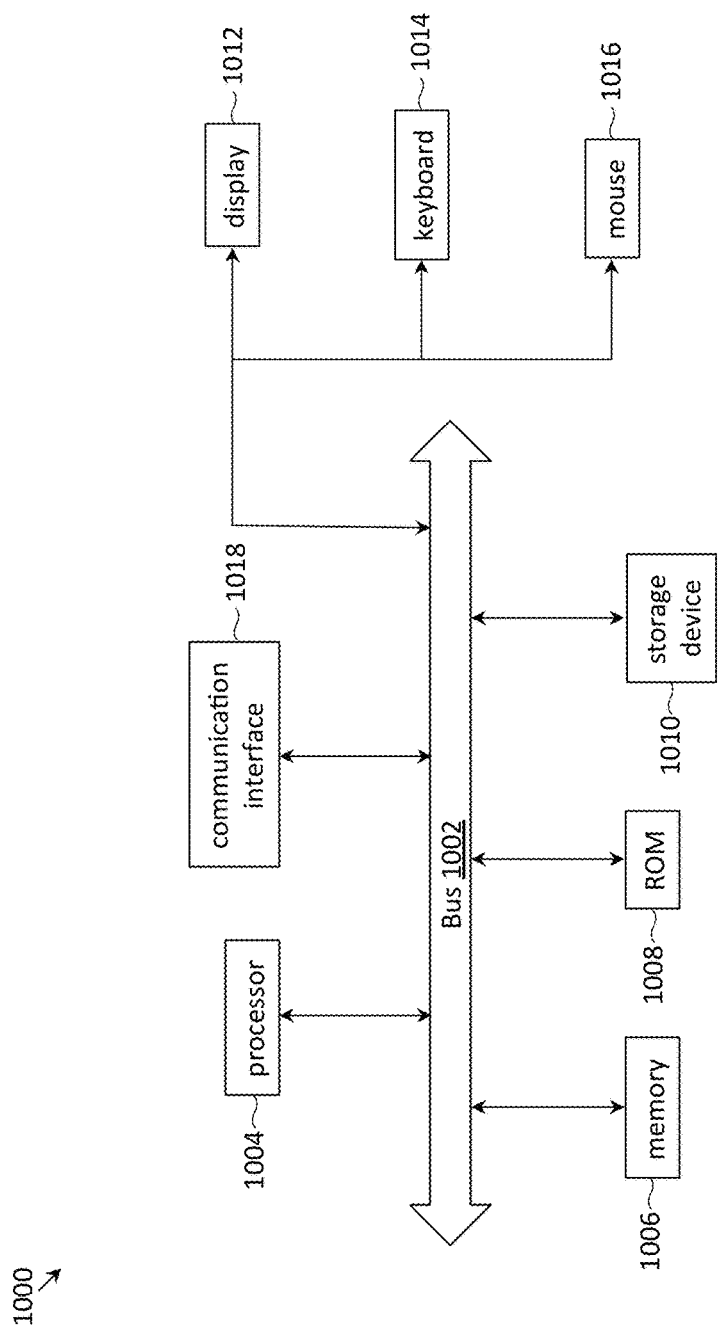
FIG. 10 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 10 provides an example of a system 1000 that may be representative of any of the computing systems (e.g., embedded device, general-purpose device, network switch, router, network sensor, server, etc.) discussed herein. Note, not all of the various computer systems have all of the features of system 1000. For example, certain ones of the computer systems discussed above may not include a display inasmuch as the display function may be provided by a client computer communicatively coupled to the computer system or a display function may be unnecessary. Such details are not critical to the present invention.

System 1000 includes a bus 1002 or other communication mechanism for communicating information, and a processor 1004 coupled with the bus 1002 for processing information. Computer system 1000 also includes a main memory 1006, such as a random access memory (RAM) or other dynamic storage device, coupled to the bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to the bus 1002 for storing static information and instructions for the processor 1004. A storage device 1010, for example a hard disk, flash memory-based storage medium, or other storage medium from which processor 1004 can read, is provided and coupled to the bus 1002 for storing information and instructions (e.g., operating systems, applications programs and the like).

Computer system 1000 may be coupled via the bus 1002 to a display 1012, such as a flat panel display, for displaying information to a computer user. An input device 1014, such as a keyboard including alphanumeric and other keys, may be coupled to the bus 1002 for communicating information and command selections to the processor 1004. Another type of user input device is cursor control device 1016, such as a mouse, a trackpad, or similar input device for communicating direction information and command selections to processor 1004 and for controlling cursor movement on the display 1012. Other user interface devices, such as microphones, speakers, etc. are not shown in detail but may be involved with the receipt of user input and/or presentation of output.

The processes referred to herein may be implemented by processor 1004 executing appropriate sequences of computer-readable instructions contained in main memory 1006. Such instructions may be read into main memory 1006 from another computer-readable medium, such as storage device 1010, and execution of the sequences of instructions contained in the main memory 1006 causes the processor 1004 to perform the associated actions. In alternative embodiments, hard-wired circuitry or firmware-controlled processing units may be used in place of or in combination with processor 1004 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 1000 or similar electronic computing device, that manipulates and transforms data represented as physical (electronic) quantities within its registers and memories into other data similarly represented as physical quantities within its memories or registers or other such information storage, transmission or display devices.

Computer system 1000 also includes a communication interface 1018 coupled to the bus 1002. Communication interface 1018 may provide a two-way data communication channel with a computer network, which provides connectivity to and among the various computer systems discussed above. For example, communication interface 1018 may be a local area network (LAN) card to provide a data communication connection to a compatible LAN, which itself is communicatively coupled to the Internet through one or more Internet service provider networks. The precise details of such communication paths are not critical to the present invention. What is important is that computer system 1000 can send and receive messages and data through the communication interface 1018 and in that way communicate with hosts accessible via the Internet.

Thus, methods and systems for remotely detecting the anomalous behavior of network-connected embedded devices have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for monitoring one or more embedded devices communicatively coupled to a first network, the method comprising:
   monitoring, by a first network sensor, network traffic on the first network;
   inspecting, by the first network sensor, the network traffic so as to distinguish network traffic that is associated with the embedded devices from network traffic that is associated with devices other than the embedded devices;
transmitting, by the first network sensor, metadata from the network traffic associated with the embedded devices to a server;
storing, at the server, the metadata in a first queue associated with the first network sensor; and
for each of the embedded devices communicatively coupled to the first network,
(i) building, by a machine learning module hosted on the server, a behavioral profile of the embedded device;
(ii) monitoring, by a behavioral analysis module hosted on the server, a behavior of the embedded device;
(iii) comparing, by the behavioral analysis module, the monitored behavior of the embedded device with a typical behavior of the embedded device as captured in the behavioral profile of the embedded device so as to determine whether the monitored behavior deviated from the typical behavior; and
(iv) if the monitored behavior deviates from the typical behavior, notifying, by a notification module hosted on the server, a user that the monitored behavior of the embedded device deviated from the typical behavior of the embedded device.

2. The method of claim 1, wherein the monitoring of the network traffic by the first network sensor comprises the first network sensor monitoring the network traffic on the first network without the first network sensor transmitting any data onto the first network.

3. The method of claim 1, wherein the one or more embedded devices comprise one or more of a web-cam, point-of-sale devices, networked medical equipment, industrial control and supervisory control devices, networked embedded devices, or other Internet-of-Things (TOT) devices.

4. The method of claim 1, wherein the devices other than the embedded devices comprise personal computers (PCs), laptops, and servers.

5. The method of claim 1, wherein the network sensor is attached to a mirror port of a network switch or a router of the first network, wherein the mirror port comprises a switched port analyzer (SPAN) port, a remote switch port analyzer (RSPAN) or a roving analysis port (RAP).

6. The method of claim 1, wherein the network sensor comprises software installed on a network switch or router of the first network.

7. The method of claim 1, further comprising receiving feedback from the user that the monitored behavior that deviated from the typical behavior is actually normal, and retraining the behavioral profile based on the feedback from the user.

8. The method of claim 1, wherein the network sensor distinguishes the network traffic associated with the one or more embedded devices from the network traffic associated with the devices other than the embedded devices based on one or more of Internet protocol (IP) addresses of the network traffic or media access control (MAC) addresses of the network traffic.

9. The method of claim 1, wherein the network traffic comprises one or more transmission control protocol (TCP)/Internet protocol (IP) packets or user datagram protocol (UDP) packets, and wherein inspecting the network traffic comprises inspecting metadata of the TCP/IP data packets without inspecting a payload of the TCP/IP packets.

10. The method of claim 9, wherein the metadata of the TCP/IP packets comprises one or more of IP addresses, TCP/IP packet length, time stamps, sequence numbers, flags, destination IP addresses, source IP addresses, or media access control (MAC) addresses.

11. The method of claim 1, further comprising:
if the monitored behavior deviates from the typical behavior, reporting, by the notification module to the user, the monitored behavior that deviated from the typical behavior.

12. The method of claim 1, wherein only metadata from the network traffic is transmitted from the network sensor to the server.

13. The method of claim 1, further comprising:
transmitting performance beacons from a first one of the embedded devices to the server, wherein the transmission of the performance beacons is caused by an execution, by a processor of the first embedded device, of computer code that has been inserted into a plurality of functions that are present in firmware of the first embedded device.

14. The method of claim 13, wherein the performance beacons are relayed from the first embedded device to the server via the first network sensor.

15. The method of claim 13, wherein the performance beacons are transmitted from the first embedded device to the server without passing through the first network sensor.

16. The method of claim 13, wherein the performance beacons are transmitted through a network interface of the first embedded device onto the first network via a first broadcast address of the first network.

17. The method of claim 13, further comprising:
reconstructing, by the server, an execution path of the first embedded device based on the performance beacons transmitted by the first embedded device; and
comparing the reconstructed execution path of the first embedded device with a typical execution path of the first embedded device, wherein the typical execution path of the first embedded device is learned over time by the machine learning module.

18. The method of claim 13, wherein the performance beacons comprises one or more of a media access control (MAC) address of the first embedded device, a program counter value of the processor of the first embedded device, a tick count of the processor of the first embedded device, or a stack value of the processor of the first embedded device.

19. A system for monitoring one or more embedded devices communicatively coupled to a first network, the system comprising:
a network switch;
a network sensor communicatively coupled to the network switch, the network sensor configured to:
monitor network traffic on the first network;
inspect the network traffic so as to distinguish network traffic that is associated with the embedded devices from network traffic that is associated with devices other than the embedded devices; and
transmit metadata from the network traffic associated with the embedded devices to a server; and
a server communicatively coupled to the network sensor, the server configured to:
store the metadata in a first queue associated with the first network sensor; and
for each of the embedded devices communicatively coupled to the first network,
(i) build a behavioral profile of the embedded device;
(ii) monitor a behavior of the embedded device;

(iii) compare the monitored behavior of the embedded device with a typical behavior of the embedded device as captured in the behavioral profile of the embedded device so as to determine whether the monitored behavior deviated from the typical behavior; and (iv) if the monitored behavior deviates from the typical behavior, notify a user that the monitored behavior of the embedded device deviated from the typical behavior of the embedded device.

20. The system of claim 19, wherein the network sensor is inserted into a mirror port of the network switch, and wherein the mirror port comprises a switched port analyzer (SPAN) port, a remote switch port analyzer (RSPAN) or a roving analysis port (RAP).

* * * * *